United States Patent [19]

Oohashi et al.

[11] Patent Number: 5,117,434
[45] Date of Patent: May 26, 1992

[54] METAL VAPOR LASER APPARATUS

[75] Inventors: Tuneyoshi Oohashi, Hitachioota; Motoo Yamaguchi; Akira Wada, both of Hitachi; Toshiharu Shirakura, Toukai; Toshimichi Kichikawa; Hiroyuki Sugawara, both of Hitachi, all of Japan

[73] Assignee: Hitachi, Ltd., Tokyo, Japan

[21] Appl. No.: 641,585

[22] Filed: Jan. 15, 1991

[30] Foreign Application Priority Data

Jan. 17, 1990 [JP] Japan .................................. 2-8013

[51] Int. Cl.$^5$ .............................................. H01S 3/22
[52] U.S. Cl. .................................. 372/56; 372/61; 372/55; 372/35; 372/34; 372/85; 372/90
[58] Field of Search .................. 372/56, 61, 55, 35, 372/34, 85, 90

[56] References Cited

U.S. PATENT DOCUMENTS

| 4,247,830 | 1/1981 | Karras et al. | 372/56 |
| 4,442,523 | 4/1984 | Bricks | 372/56 |
| 4,815,091 | 3/1989 | Hara et al. | 372/56 |

FOREIGN PATENT DOCUMENTS 0026879 2/1987 Japan .
0102268 7/1988 Japan .

OTHER PUBLICATIONS

"Large Scale Copper Vapor Laser Computer Control Systems", M. J. LaChapell et al., ISA Annual Conference, 1979, pp. 61–71.

Primary Examiner—Georgia Y. Epps
Attorney, Agent, or Firm—Antonelli, Terry, Stout & Kraus

[57] ABSTRACT

A metal vapor laser has a discharge tube with electrodes at opposite ends. A power source is electronically connected to the electrodes and generates a discharge in a discharge region within the discharge tube. The discharge generates laser light which emerges from the tube via windows. In order to cool the apparatus, the discharge tube is surrounded by a cooling jacket in the form of a hollow cooling vessel. A liquid flows in the cooling vessel and removes heat. The space between the cooling vessel and the discharge tube is evacuated. The cooling vessel is conductive and, since it is connected between one of the electrodes and the power supply, its inner and outer walls provide two potential paths for return current. The fact that the inner and outer walls have different diameters means that the inductance of the return paths is large. Therefore, the outer wall has a gap in it filled with insulating material. This forms a break in the conductive path from the electrode to the power source through the outer wall, and so reduces the inductance of the return path. Other geometries are also possible in which all but the innermost path are broken by insulating material.

17 Claims, 3 Drawing Sheets

METAL VAPOR LASER APPARATUS

BACKGROUND OF THE INVENTION

1. FIELD OF THE INVENTION

The present invention relates to a metal vapor laser apparatus. It is particularly, but not exclusively, concerned with a copper vapor laser.

2. SUMMARY OF THE PRIOR ART

At its simplest, a metal vapor laser comprises a discharge tube with electrodes at each end. The introduced into the discharge tube. By applying a voltage between the electrodes, from a suitable power source, an electrical discharge can be set-up within the discharge tube, which vaporises the metal. The metal vapor is excited to emit laser light.

Normally, the discharge tube is made of an insulating heat resistant substance such as a ceramic. Therefore, it is necessary to provide a return current path from one of the electrodes to the power source, the power source normally being connected substantially to the other electrode.

One factor which is important in the design of a metal vapor laser is to provide means for dissipating heat generated during the discharge. For low power applications, air-cooling methods are normally used, in which the discharge tube is surrounded by a casing, and an air flow is introduced into the interior of the casing, to permit heat exchange between the discharge tube and that air, and so permit the heat to be removed from the discharge tube. In order to improve this effect, one or more vanes may be provided coaxially between the discharge tube and the casing. In such air-cooled arrangements, the casing is conductive, and it has been proposed in JP-A-62-26879 for that casing to provide a return current path from one of the electrodes to the power source.

Furthermore, in U.S. 4815091, it was proposed that the innermost vane between the casing and the discharge tube be connected between the power source and one electrode, to provide a second return path. It was believed that this would reduce the inductance of the discharge load, which inductance is primarily determined by the inductance in the return path(s).

For metal vapor lasers of high power, however, air cooling is not satisfactory, because it cannot dissipate heat sufficiently rapidly. Therefore, it is also known to provide a conductive jacket coaxially around the discharge tube, which jacket has inner and outer conductive walls with a space therebetween, so that the jacket forms a cooling vessel. If a liquid, such as oil, is introduced into that space, heat may be extracted thereby. Examples of metal vapor lasers using cooling jackets are disclosed in e.g. JU-A-63-102268 and the article entitled Large Scale Copper Vapor Laser Computer Control Systems, by M. J. LaChapell et al in ISA Annual Conference 1979.

When such a jacket is used, the jacket is normally located between a connection point to the power source and one of the electrodes, so that the conductive inner and outer walls of the jacket form two current return path.

SUMMARY OF THE INVENTION

In the arrangements discussed above, there are a plurality of current return paths. In the case of air-cooled arrangements, one path is through the outer casing and the other is through one or more of the cooling vanes. In the liquid cooled arrangements, the conductive inner and outer walls of the jacket provide those two return paths. In each case, each return path is formed by a cylindrical wall extending coaxially of the discharge tube.

However, as will be discussed in more detail below, the inductance of a cylindrical insulator depends on its length, and on its inner and outer diameters. Therefore, since the inner diameters of the conductive walls forming the two return paths are necessarily different, the two return paths will have different inductances. In calculating the total inductance of the return path, two inductances of the inner and outer walls may be considered mathematically as equivalent to a single wall of specified inner and outer diameters. However, the fact that existing systems have two return paths means that the equivalent thickness is large, and it becomes difficult to adjust the inductance of the return path to the desired value for efficient discharge. For example, where the return paths are via the inner and outer walls of a cooling jacket, those walls must have a predetermined thickness and space if cooling is to be efficient, but it may then be difficult for the inductance caused by the jacket to be adjusted to the correct value.

Therefore, the present invention, at its most general, proposes that the coaxially outer return path (assuming there are two return paths) is broken, by providing insulating material in that path. If there are more than two return paths, all but the innermost may be broken. This idea is applicable both to arrangements involving air-cooling, and to those involving liquid cooling using a jacket.

Thus, the present invention may provide a metal vapor laser apparatus, comprising:

a discharge tube;

first and second electrodes at opposite ends of said discharge tube for generating a discharge therebetween in said discharge tube;

a first wall connected to said first electrode said first wall being conductive and extending coaxially of said discharge tube;

a power source connected between said second electrode and a connection point electrically connected to a part of said conductive wall remote from said first electrode, said first wall defining a first path from said first electrode to said power source; and a second wall coaxially outwardly of said first wall and extending between said first electrode and said part of the first wall to which said power source is connected, said second wall forming part of a second path from said first electrode to said power source; wherein at least a part of said second path is of electrically insulating material, said electrically insulating material being arranged to prevent electrical conduction along said second path.

Of course, the metal vapor laser apparatus may be sold seperately from the power source, in which case the present invention is concerned with insulating material in the outer return path(s) to the point at which connection to the power source, will, in due course, be made.

When the present invention is applied to air-cooled arrangements, the insulating material is in the outer casing which extends between one electrode and the point of connection to the power source, and the return current path is formed by the innermost vane from that electrode to the power source. The insulating material may be at either end of the casing, or at an intermediate point, but will normally extend circumferentially wholly around the discharge tube to provide a suitable break in the return current path through the casing. Indeed, it is possible to make the casing wholly of insulating material if desired.

Where the present invention is applied to a liquid cooled arrangement, the insulating material may be provided in the outer wall of the jacket, again at an intermediate point extending circumferentially around the discharge tube. However, there is a further alternative. If an inner conductive wall is provided between the electrode and the point of connection to the power source, with the jacket outside that inner wall, then insulating material may be provided at either end of the jacket, in both walls of the jacket, or the jacket may be made wholly of insulating material. The inner wall then provides the return path. However, if the insulating material is at one end of the jacket, the current flow in the inner wall, radially inwards from the jacket, may induce eddy currents in the jacket, which could cause power losses. Therefore, if the insulating material is provided at one end of the jacket, it is desirable that there is further insulating material at an intermediate point along at least one of the jacket walls, to prevent the formation of such eddy currents.

Normally, the power source is connected substantially directly to one of the electrodes, so that the return path is then from the other electrode back along substantially the whole length of the discharge tube. If the connection to the power source was provided at an intermediate point along the length of the discharge tube, however, it may be necessary to apply the present invention between each connection to the power source and the corresponding electrode, if there was a double-walled part, giving the two current paths between each connection point and the corresponding electrode.

BRIEF DESCRIPTION OF THE DRAWINGS

Embodiments of the present invention will now be described in detail, by way of example, with reference to the accompanying drawings, in which.

DETAILED DESCRIPTION

As was discussed above the present invention is applicable to both air cooled and liquid cooled metal vapor laser apparatuses. The first two embodiments, shown in FIGS. 1 and 2 involve liquid cooling.

Figure 1:
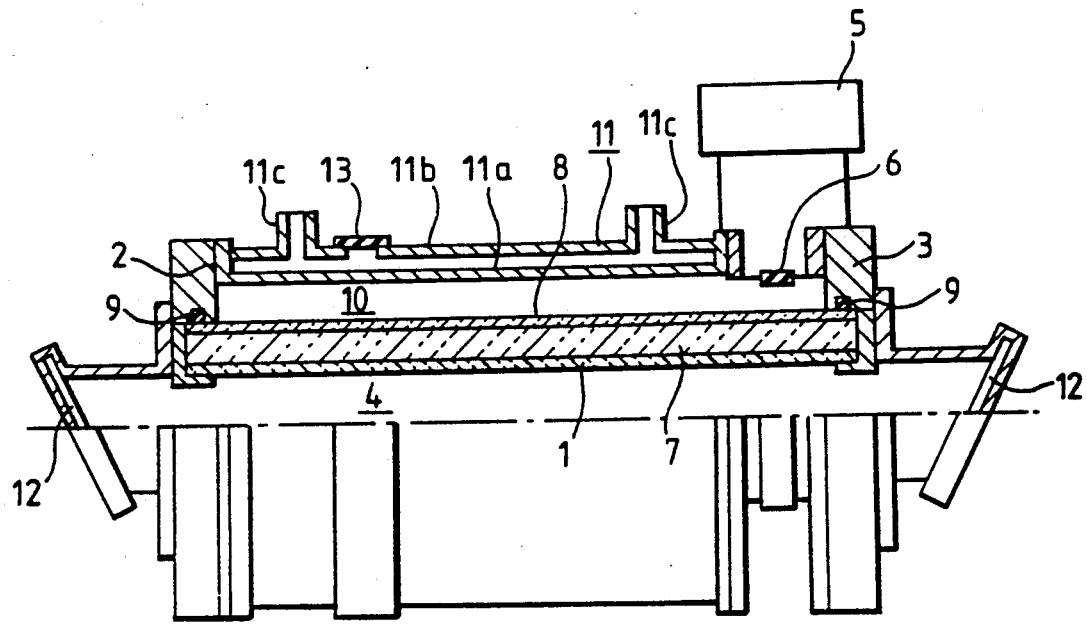
FIG. 1 is a longitudinal section illustrating a first embodiment of a metal vapor laser apparatus according to the present invention.

FIG. 1 illustrates the structure of a first embodiment of a copper vapor laser apparatus. A discharge tube 1 is formed of an insulating heat resistant substance such as ceramics etc. Electrodes 2, 3 are located at each end of the discharge tube 1, and a discharge may be generated between the electrodes 2, 3 by electric voltage and electric current supplied from a pulse power source 5.

The discharge occurs in a discharge region 4 located between the electrodes 2, 3. During the discharge, the discharge tube 1 and metallic copper (not shown in the drawing) inside the discharge tube, not shown in the drawing, are heated, and copper vapor is generated and excited to emit laser light. The electrodes 2, 3 are each insulated electrically by an insulating body 6. A thermal insulator 7 and a glass tube 8 are installed outside of the discharge tube 1 and are sealed hermetically with an O-ring 9. A vacuum thermal insulating layer 10 is provided outside the glass tube 8, and is evacuated to provide vacuum thermal insulation. The outer circumference of the vacuum thermal insulating layer 10 has a jacket in the form of a cooling vessel 11 for preventing temperature rise by radiation heat. To provide cooling water or oil etc. flows in the cooling vessel.

A window 12 to permit laser light to pass is provided beyond each of the electrodes 2, 3 and the discharge region 4 is maintained air-tight. Laser light passes outside of the apparatus using total reflecting mirrors and semi-transparent mirrors, which are not shown in the drawing, installed outside each pair of windows 12. Electric current from the pulse power source 5 flows through the electrode 3, the discharge region 4, the electrode 2, the cooling vessel 11 and returns to the pulse power source 5.

Figure 5:
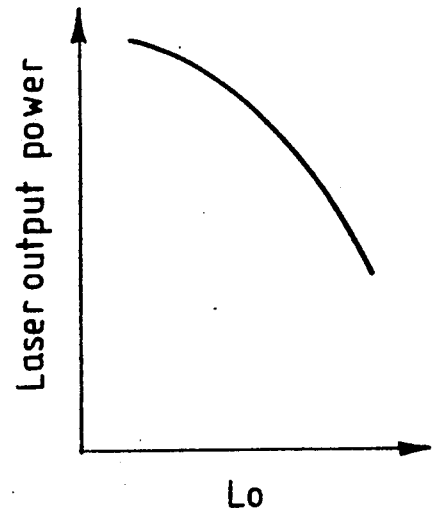
FIG. 5 is a graph illustrating the characteristics of laser output power.

As the excitment lifetime of copper in a copper vapor laser is short, it is necessary for the excitment and discharge of the laser to occur in a short period. An example of the relationship between the inductance $L_O$ of the discharge tube circuit formed by the electrode 3, the discharge region 4, the electrode 2, and the cooling vessel 11, with a laser output power 2 is shown in FIG. 5. In FIG. 5 it is assumed that there is constant input power to the discharge region 4). FIG. 5 indicates that a laser output power increases as the inductance $L_O$ decreases. As the input power is constant, the efficiency of the output power of the laser increases proportionally. The relationship discussed above shows that a decrease of the inductance of the discharge tube causes a rapid increase in the discharge current from the pulse power source 5 and a large peak value of the discharge current, and consequently, a large electric amount of power is input in a short period and the copper vapor is excited effectively.

From the above description, measures to decrease the inductance of a discharge tube circuit, which are applied to the present embodiments as will now be described.

Figure 3:
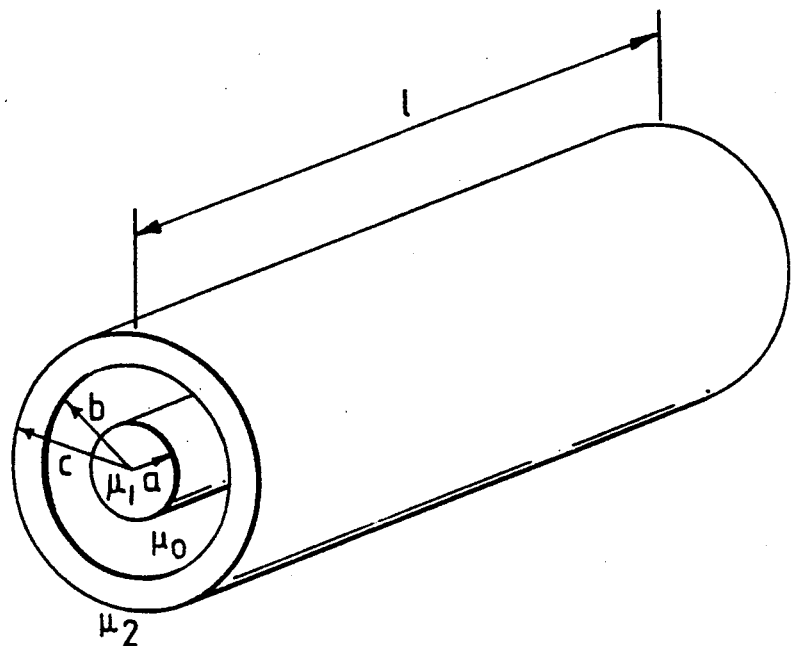
FIG. 3 is a schematic illustration for description of a coaxial conductive body.

With a coaxial conductor having a central conductor and a coaxial outer conductor as shown in FIG. 3, and when the central conductor forms an outward path of electric current and the coaxial outer conductor forms a return path for the electric current, the conductance L of the coaxial conductor described above is expressed by equation (1) below where the permeabilities of the intermediate substance between the central conductor and the coaxial outer conductor, the central conductor, and the coaxial conductor are designated as $H_0$, $H_1$, $H_2$, respectively $$L = \frac{\mu_0 l}{4\pi} \left( 2\log \frac{b}{a} + \frac{2c^4 \mu_2}{(c^2 - b^2)^2} \log \frac{c}{b} - \right. \tag{1}$$

Figure 4:
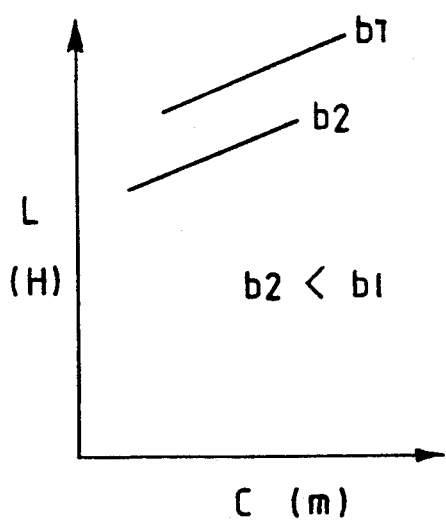
FIG. 4 is a graph illustrating the inductance characteristics.

-continued $$\left. \frac{(3c^2 - b^2)\mu_2}{2(c^2 - b^2)} + \frac{\mu_1}{2} \right)$$

where,
- a is the radius of the central conductor
- b is the inner radius of the coaxial conductor
- c is the outer radius of the coaxial conductor
- l is the length of the coaxial conductor FIG. 4 shows the relationship between the outer radius of the coaxial conductor C, and the inductance L for two coaxial conductors having inner radii $b_1$ and $b_2$ respectively. It is assumed that $b_1$ is larger than $b_2$. Comparing the structure of the central conductor and the coaxial outer conductor shown in FIG. 3 with the structure of the region of the discharge tube and the cooling vessel 11 reveals that, when the return circuit for electric current from the discharge region is coaxial with the discharge region and in a position close to the discharge region, the inductance of the discharge tube circuit to the pulse power source becomes small, and, by reducing the thickness of the conductor comprising the return circuit for electric current the conductance is decreased.

From the theory described above, then inductance of the discharge tube circuit may be decreased by providing the structure that will now be described. With reference to FIG. 1, the inner conductive wall 11a of the cooling vessel 11 facing the vacuum thermal insulating layer 10 forms a return path for discharge current, and a small part of the outer conductive wall 11b of the cooling vessel 11 is cut away, the cut section (gap) having a tubular shape with a small width to prevent that outer wall 11b from conducting discharge current. To ensure air-tight structure, with insulating material fills the cut section in the outer conductive wall 11b. That insulating material breaks the current path through the outer wall 11b, and so prevents that outer wall forming a current return path between the electrode 2 and the power source.

With the method described above, the return path of the current from the discharge region 4 is located closer to the discharge region 4, and an equivalent thickness of the conductor which comprises the return circuit for electric current is thin. Consequently, the inductance of the discharge tube circuit is decreased. Also, it prevents the cooling vessel from making a closed current loop, in which eddy currents may be induced.

As described above, the insulating material 13 has suitable electrically insulating properties to prevent the outer conductive wall 11b of cooling vessel 11 conducting discharge current from the discharge region 4 and also to prevent the cooling vessel 11 forming a closed loop including the inner conductive wall 11a and the outer conductive wall 11b. Such a closed loop may result in eddy currents in the cooling vessel. Generally, as the cooling vessel is made of stainless steel and the voltage drop of discharge current conducted by the inner conductive body 11a is small, the electrical voltage loaded to the insulating material 13 is also small. Consequently, the insulating material 13 should be substance having enough electrical resistivity substantially to prevent the outer conductive body 11b of the cooling vessel 11 from conducting electric current irrespective of the size of the cut away width of the outer conductive wall 11b of the cooling vessel 11.

As illustrated in FIG. 1, the insulating material 13 is located at an intermediate point between the inlet ant outlet 11c of the cooling vessel 11. However, the insulating material 13 could be between the inlet or outlet 11c and the adjacent end of the cooling vessel 1. Indeed, it is possible for the whole of the outer wall 11b of the cooling vessel 11 to be of insulating material but such a cooling vessel is difficult to manufacture.

Figure 2:
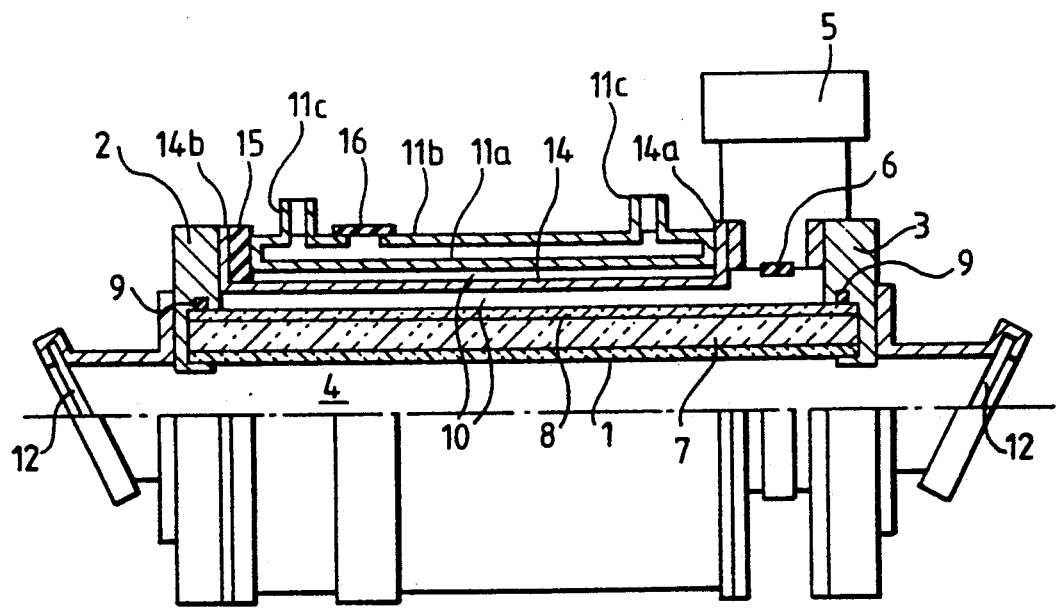
FIG. 2 is a longitudinal section illustrating a second embodiment of the present invention.

FIG. 2 shows a second embodiment. Parts shown in FIG. 2 are the same or similar to a corresponding part in FIG. 1 are indicated by the same reference numerals. However, the second embodiment does not use the inner conductive wall 11a of the cooling vessel 11 as a return path for discharge current, and instead a coaxial conductive wall 14 is located inwardly of the cooling vessel.

As shown in in FIG. 2, the coaxial conductive wall 14 is in coaxial to the discharge tube 1 and the cooling vessel 11. The coaxial conductive wall 14 is in vacuum thermal insulating layer 10 which is between a glass 8 consisting of a wall aroung the discharge tube 1 and the inner conductive body 11a of a cooling vessel 11. The coaxial conductive body 14 has flanges 14a, 14b at both ends, and one of the flanges 14a is connected to an electric connection point for a power source 5 and another flange 14b is connected to the electrode 2. An insulating material 15 is installed between the flange 14b of the coaxial conductive body 14 and an end of the cooling vessel 11.

In the structure described above, the return path for discharge current is formed inside of the cooling vessel 11, through the coaxial conductive wall 14 and discharge current does not flow through the cooling vessel 11, due to the insulating material 15.

Consequently, the inductance of a discharge tube circuit becomes small. The second insulating body 15 has the same electric characteristics as of the first insulating body 13 in FIG. 1.

Thus, the insulating material 15 in FIG. 2 acts in a similar way to the conductive material 13 in FIG. 1. If the conductive material 15 were not present, there would be three current paths from the electrode 2 to the power source 5. One of those paths would be through the wall 14 and the other two through the inner and outer walls 11a, 11b of the cooling vessel 11. The use of insulating material 15 breaks all but the innermost of those paths. A similar effect could be achieved if the insulator material was between the flange 14a and the adjacent end of the cooling vessel 11.

Although, in the second embodiment the insulating material 15 blocks current paths through the cooling vessel 11, there may still be the problem of eddy currents. In the embodiment of FIG. 1, the provision of insulating material 13 blocked both eddy currents and the outer current path. The insulating material 15 can only block one of these, however, and therefore further insulating material 16 may be provided in one of the inner and outer walls 11a, 11b of the cooling vessel 11. As shown in FIG. 2, the insulating material 16 is in the outer wall 11b so that the structure of the cooling vessel 11 of the embodiment of FIG. 2 is exactly the same as that of the embodiment of FIG. 1. However, the insulating material 16 is, at least partially, performing a different function from the insulating material 13 and therefore the insulating material 16 may be provided in the inner wall, or may be omitted if eddycurrents do not present a problem in any particular case.

In the second embodiment, it is desirable to use materials which have a high reflection coefficient to thermal radiation to form the coaxial conductive wall 14 to enable the coaxial conductive wall 14 to act as a thermal reflecting plate, so that an improvement in thermal insulating characteristics is obtained.

In the embodiment described above, the metal vapor laser is cooled by cooling liquid in the cooling vessel (jacket) 11. However, the present invention is also applicable to air cooled metal vapor lasers. An embodiment in which this occurs will now be described with reference to FIG. 6.

Figure 6:
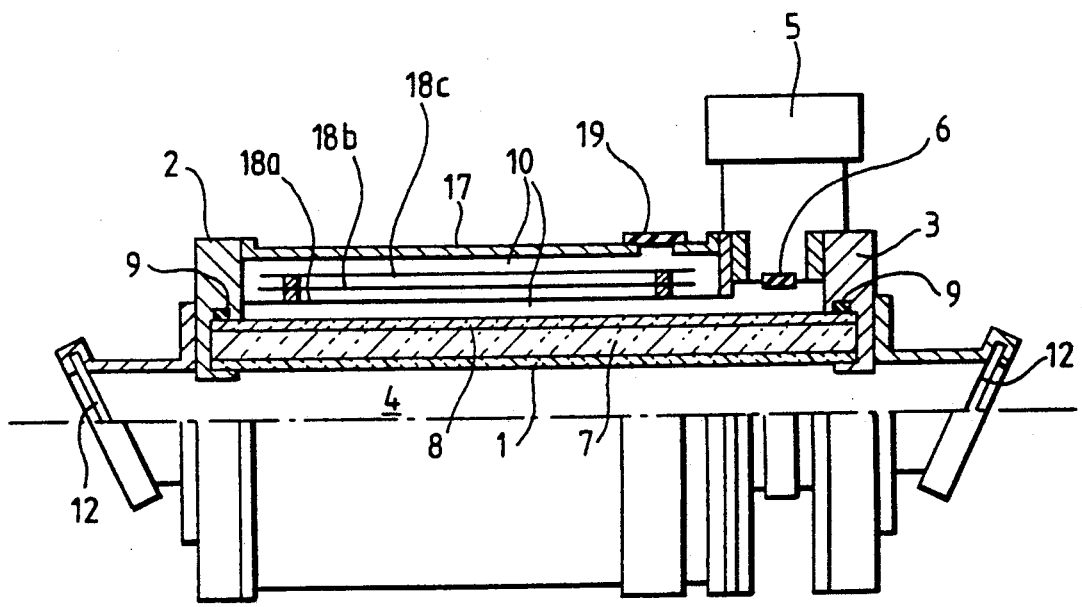
FIG. 6 is a longitudinal section illustrating a third of the present invention.

In FIG. 6, the general configuration of the metal vapor laser is similar to that of FIG. 1, and corresponding parts are indicated by the same reference numerals. FIG. 6 differs from FIG. 1, however, in that the cooling vessel 11 is omitted.

In FIG. 6, the metal vapor laser has an outer casing 17 of conductive material which extends coaxially of the discharge tube 1, and connects the electrode 2 to the power source 5. Within the casing 17, but outside the glass tube 8 surrounding the discharge tube 1 are a plurality of vanes 18a, 18b, 18c which also extend axially of the discharge tube 1. These vanes 18a, 18b, 18c act as thermal radiation shields, and are made of conducting material which has been made heat reflective. As can be seen from FIG. 6, the innermost vane 18a connects the electrode 2 and the power source 5.

If the conductive casing extended completely from the electrode 2 to the power source 5, there would then be two paths for return current from the electrode 2 to the power source 5, one via the casing 17 and the other via the inner vane 18a. The apparatus would then suffer the same problems that were discussed earlier in connection with FIG. 1, if there were two paths for return current. In order to overcome those problems, however, a gap is formed in the outer casing 17, and this gap is filled with insulating material 19, which insulating material 19 breaks the conductive path from the electrode 2 to the power source 5 through the casing 17. Thus, the insulating material 19 performs a similar effect with respect to the casing 17 as does the insulating material 13 with respect to the outer wall 11b of the cooling vessel 11 in the embodiment of FIG. 1. in this way, the only return current path is through the inner vane 18a, so that there is only a single return path and the impedence of the return circuit can be selected to a suitable value.

As shown in FIG. 6, the insulating material is at the end of the casing 17 close to its connection to the power source 5; this is not essential and the insulating material 19 can be located at any point in the path between the electrode 2 and the power source 5 via the casing 17, including e.g. directly between the electrode 2 and the end of the casing 17 adjacent that electrode 2. As in the embodiment of FIG. 1, the gap filled by the insulating material 19 has a tubular shape with a small width. Again, as in the embodiments of FIG. 1, the insulating material 19 is selected so as to prevent the flow of current. It is also possible, of course, for the whole of the casing 17 to be of insulating material, but this is difficult to achieve in practice.

As described above, the present invention permits a decrease in the inductance of a discharge tube circuit, and consequently, provides an apparatus for a metal vapor laser having a high efficiency by forming the return path for discharge current from the a discharge region with a coaxial conductive wall having the smallest diameter among a plurality of coaxial conductive walls of different diameters outside of the discharge tube.

Further, as the present invention prevents the formation of a closed loop among a plurality of coaxial conductive bodies which have different diameters, loss of electric power loss and increase of inductance, which are caused by eddy currents flowing in the closed loop, are eliminated.

What is claimed is

1. A metal vapor laser apparatus, comprising:
    a discharge tube;
    first and second electrodes at opposite ends of said discharge tube for generating a discharge therebetween in said discharge tube;
    a first wall connected to said first electrode said first wall being conductive and extending coaxially of said discharge tube;
    a power source connected between said second electrode and a connection point electrically connected to a part of said first wall remote from said first electrode, said first wall defining a first path from said first electrode to said power source; and
    a second wall coaxially outwardly of said first wall and extending between said first electrode and said part of the first wall to which said power source is connected, said second wall forming part of a second path from said first electrode to said power source, at least a part of said second path being of electrically insulating material, said electrically insulating material is arranged to prevent electrical conduction along said second path.

2. An apparatus according to claim 1, wherein said first and second walls form inner and outer walls of a cooling vessel for said apparatus.

3. An apparatus according to claim 1, wherein said second wall forms one wall of a cooling vessel for said apparatus and there is a further wall extending coaxially of said first and second walls, said further wall forming another wall of said cooling vessel.

4. An apparatus according to claim 3, wherein said second wall is located outwardly of said further wall.

5. An apparatus according to claim 1, wherein said first wall is a reflective wall for reflecting thermal energy and said second wall forms a casing wall of said apparatus.

6. An apparatus according to claim 1, wherein said insulating material is adjacent said first electrode.

7. An apparatus according to claim 6, wherein there is further insulating material in a part of said second wall intermediate said second electrode and the connection to said power source.

8. An apparatus according to claim 1, wherein said insulating material is adjacent said part of said first wall to which said power source is attached.

9. An apparatus according claim 1, wherein said insulating material is in a part of said second wall intermediate said second electrode and the connection to said power source.

10. An apparatus according to claim 1, wherein the insulating material extends circumferentially around the discharge tube.

11. A metal vapor laser apparatus, comprising:
    a discharge tube;
    first and second electrodes at opposite ends of said discharge tube for generating a discharge therebetween in said discharge tube;

a first wall connected to said first electrode, said first wall being conductive and extending coaxially of said discharge tube;

a first connection point for connection to a power source, said first connection point being electrically connected to a part of said first wall remote from said first electrode, said first wall defining a first path from said first electrode to said first connection point;

wherein:

a second connection point for connection to the power source, said second connection point being electrically connected to said second electrode; and a second wall coaxially outwardly of said first wall and extending between said first electrode and said part of the first wall to which said first connection point is connected, said second wall forming part of a second path from said first electrode to said first connection point;

characterised in that:

at least a part of said second path is of electrically insulating material, said electrically insulating material is arranged to prevent electrical conduction along said second path.

12. An apparatus according to claim 11, wherein there is an additional insulator between said first and second connection points.

13. An apparatus according to claim 11, wherein said first and second walls form inner and outer walls of a cooling vessel for said apparatus.

14. An apparatus according to claim 11, wherein said second wall forms one wall of a cooling vessel for said apparatus and there is a further wall extending coaxially of said first and second walls, said further wall forming another wall of said cooling vessel.

15. An apparatus according to claim 11, wherein said first wall is a reflective wall for reflecting thermal energy and said second wall forms a casing wall of said apparatus.

16. A cooling jacket for a metal vapor laser apparatus, the jacket comprising:

inner and outer coaxial walls of conductive material having an annular space therebetween for cooling fluid;

end walls between said inner and outer walls for sealing the ends of said space; and an inlet and outlet to said space for cooling fluid;

wherein:

one of said inner and outer coaxial walls has a circumferential gap therein, and there is electrically insulating material bridging the gap.

17. An apparatus according to claim 1, further comprising additional insulating material extending circumferentially around the discharge tube.

* * * * *